(12) United States Patent
Huang et al.

(10) Patent No.: US 11,417,147 B2
(45) Date of Patent: Aug. 16, 2022

(54) ANGLE INTERFERENCE RESISTANT AND OCCLUSION INTERFERENCE RESISTANT FAST FACE RECOGNITION METHOD

(71) Applicant: SOUTH CHINA UNIVERSITY OF TECHNOLOGY, Guangdong (CN)

(72) Inventors: Han Huang, Guangdong (CN); Di Liu, Guangdong (CN); Zhifeng Hao, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 79 days.

(21) Appl. No.: 16/979,187

(22) PCT Filed: Dec. 31, 2018

(86) PCT No.: PCT/CN2018/126069
§ 371 (c)(1),
(2) Date: Sep. 9, 2020

(87) PCT Pub. No.: WO2019/169942
PCT Pub. Date: Sep. 12, 2019

(65) Prior Publication Data
US 2020/0410214 A1    Dec. 31, 2020

(30) Foreign Application Priority Data
Mar. 9, 2018 (CN) .......................... 201810194207.5

(51) Int. Cl.
*G06V 40/16* (2022.01)
*G06K 9/62* (2022.01)
(Continued)

(52) U.S. Cl.
CPC .......... *G06V 40/168* (2022.01); *G06K 9/627* (2013.01); *G06N 3/08* (2013.01); *G06T 3/4046* (2013.01);
(Continued)

(58) Field of Classification Search
CPC ........... G06K 9/00221; G06K 9/00268; G06K 9/00228; G06K 9/00288; G06K 9/4609;
(Continued)

(56) References Cited

U.S. PATENT DOCUMENTS

2018/0025217 A1   1/2018 Chandraker et al.
2019/0220738 A1*  7/2019 Flank ....................... G06N 3/08

FOREIGN PATENT DOCUMENTS

| CN | 106780906 | 5/2017 |
| CN | 106909905 | 6/2017 |

(Continued)

OTHER PUBLICATIONS

"International Search Report (Form PCT/ISA/210) of PCT/CN2018/126069," dated Apr. 10, 2019, pp. 1-4.

*Primary Examiner* — Mark Roz
(74) *Attorney, Agent, or Firm* — JCIPRNET

(57) ABSTRACT

The present invention provides an angle interference resistant and occlusion interference resistant fast face recognition method, comprising: first collecting a training set of images which have been detected and cropped, adjusting and expanding the training set, and conducting standardized pre-processing; inputting the same into a constructed neural network for training, and saving a parametric model; adjusting test data to a suitable size and number of channels, and also conducting standardized pre-processing; inputting the same into a prediction network to obtain feature vectors of face images; and determining whether two faces are from the same person by calculating a distance between the feature vectors of the face images.

10 Claims, 2 Drawing Sheets

(51) Int. Cl.
  *G06N 3/08* (2006.01)
  *G06T 3/40* (2006.01)
  *G06V 10/44* (2022.01)

(52) U.S. Cl.
  CPC .......... *G06V 10/443* (2022.01); *G06V 40/161* (2022.01); *G06V 40/172* (2022.01); *G06T 2207/20081* (2013.01); *G06T 2207/20084* (2013.01); *G06T 2207/20132* (2013.01); *G06T 2207/30201* (2013.01)

(58) Field of Classification Search
  CPC ........ G06K 9/627; G06N 3/08; G06T 3/4046; G06T 2207/20081; G06T 2207/20084; G06T 2207/20132; G06T 2207/30201
  See application file for complete search history.

(56) References Cited

FOREIGN PATENT DOCUMENTS

| CN | 107203752 |   | 9/2017  |            |
|----|-----------|---|---------|------------|
| CN | 108509862 |   | 9/2018  |            |
| CN | 110781928 | * | 10/2019 | G06K 9/6256 |

* cited by examiner

ANGLE INTERFERENCE RESISTANT AND OCCLUSION INTERFERENCE RESISTANT FAST FACE RECOGNITION METHOD

CROSS-REFERENCE TO RELATED APPLICATION

This application is a 371 of international application of PCT application serial no. PCT/CN2018/126069, filed on Dec. 31, 2018, which claims the priority benefit of China application no. 201810194207.5, filed on Mar. 9, 2018. The entirety of each of the above mentioned patent applications is hereby incorporated by reference herein and made a part of this specification.

TECHNICAL FIELD

The present invention belongs to the technical field of biological recognition, and more particularly, relates to an angle interference resistant and occlusion interference resistant fast face recognition method.

BACKGROUND

Started from 1970s, the development of face recognition technologies has been one of the hottest research topics in the field of computer vision up to now. In recent years, with the rapid development of modern information technologies and an urgent need of people for automatic identity verification, biological feature recognition technologies have been developed rapidly in recent years. Modern biological recognition technologies mainly recognize and identify a personal identity by using inherent physiological and behavioral features of a human body through combination of a computer and an advanced technology. The modern biological recognition technologies mainly comprise: fingerprint recognition, retina recognition, iris recognition, vein recognition, gait recognition, face recognition, etc., wherein the face recognition is the most popular biological feature recognition technology and has many application scenarios. The most traditional scenarios of the face recognition comprise security, access control and monitoring fields. The face recognition appears in entrance and exit gates of customs border inspection as well as in safety door locks of safe boxes of a bank. Compared with traditional security means such as a password, a certificate, a key card, and the like, the face recognition is a natural "ID Card" attached to a face, and according to the distribution of five sense organs and contours of the face, these distributed features vary from person to person and are innate, thus being extremely difficult to be faked. Therefore, the face recognition is being accepted by users in a natural, intuitive and non-invasive manner.

Most traditional face recognition methods use a shallow structure to extract features of a face image. These methods have a limited ability to extract hidden features of the face image, and recognition effects of these methods are unsatisfactory. In the past two years, the great improvement on performances of computing devices and the appearance and development of deep learning have greatly improved an accuracy and a precision of the face recognition.

SUMMARY

Aiming at the shortcomings of a traditional face recognition method, the present invention provides an angle interference resistant and occlusion interference resistant fast face recognition method. An objective of the present invention is to compare two given face images to judge whether the two face images are from the same person, and two parts are needed to achieve the solution: one is to use a large number of datasets to train a face recognition model, and the other is to use the model to compare the two face images.

In order to achieve the above objective, the technical solutions used in the present invention are as follows.

An angle interference resistant and occlusion interference resistant fast face recognition method according to the present invention comprises the following steps:

(a) taking a training set of a large number of face images which have been detected and cropped, and adjusting the training set to make images of side faces and faces with glasses occupy 10% to 20% of a dataset;

(b) reading in the training set of face images in the step (a), expanding the training set by randomly cropping and randomly flipping, expanding a single-channel image into a three-channel RGB image, scaling the image to a set size, and standardizing the image;

(c) constructing a neural network for training a face dataset by combining and adjusting various effective structures, and inputting the dataset in the step (b) into the neural network and using a GPU to accelerate training the neural network, so as to obtain a trained network parametric model file;

(d) extracting a partial structure from the trained neural network constructed in the step (c) to form a neural network for extracting face features for prediction, and using the prediction network to load the network parametric model file obtained in the step (c);

(e) scaling the detected and cropped face images to be compared to the set size in the step (b), and converting a single-channel image therein into a three-channel RGB image;

(f) inputting the training set in the step (b) into the prediction network, calculating feature vectors of the images, sampling the training set and calculating a distance, testing different thresholds as a standard to judge whether two images are from the same person, and selecting a threshold with a highest accuracy as a final threshold; and (g) inputting test images of in the step (e) into the prediction network in the step (d), calculating the feature vectors of the test images, calculating a Euclidean distance between the feature vectors corresponding to two face images to be compared, and judging whether the two faces are from the same person according to the final threshold calculated in the step (f), and using the final threshold as a judgment standard for face comparison.

As a preferred technical solution, in the step (b), a method for expanding the single-channel image into the three-channel RGB image comprises:

assigning a RGB three-channel value of each pixel in the image as a value of the pixel of the single-channel image, wherein a standardized processing method is:

$$\text{image\_x}_{std} = \frac{(x - \text{mean})}{\text{adjusted\_stddev}},$$

$$\text{adjusted\_stddev} = \max\left(stddev, \frac{1.0}{\sqrt{numpixels}}\right).$$

wherein x is a pixel value of the image, $\text{image\_x}_{std}$ is a standardized pixel value, mean is an average value of all the RGB three-channel pixel values in the image, stddev is a standard deviation of the image, and numpixels is a number of image pixels.

As a preferred technical solution, the step (c) comprises the following steps:

(c-1) using Inception-Resnet V1 as a topmost basic network structure, and setting a number of nodes of a last fully connected layer of the Inception-Resnet V1 as 128;

(c-2) adding a fully connected layer under the basic network structure, the number of the nodes being a number of persons constituting the training set of the face images;

(c-3) constructing a loss function, and using a softmax loss function and a center loss function as a final loss function used for training the network; and (c-4) using an Adagrad method as an optimizer to train the neural network and starting to use the GPU to accelerate training the neural network, and saving the network parametric model file after network convergence.

As a preferred technical solution, in the step (c-1) and the step (c-2), network model parameters are initialized by truncated normal distribution with a standard deviation of 0.1, wherein weight decay is set as 0.00005, and a retention rate of a dropout layer in the network is set as 0.8.

As a preferred technical solution, the softmax loss function in the step (c-3) is $$L_s = -\sum_{i=1}^{m} \log \frac{e^{W_{y_i}^T x_i + b_{y_j}}}{\sum_{j=1}^{n} e^{W_j^T x_i + b_j}},$$

wherein $x_i \in R^d$ is a feature vector of an $i^{th}$ image, which belongs to a $y_i^{th}$ class, d is a feature dimension of the feature vector, $W \in R^{d \times n}$ is a weight matrix of the fully connected layer in the step (c-2), $W_j \in R^d$ is a $j^{th}$ column of W, $b \in R^n$ is an offset value, m is a number of images in each batch introduced into the trained neural network, and n is a number of classes, for example, if data introduced into the network comprise face images of Tom, Jack and Mary, then n is 3; and the center loss function in the step (c-3) is $L_c = \frac{1}{2}\sum_{i=1}^{m} \|x_i - c_{y_i}\|_2^2$, wherein $Cy_i \in R^d$ is a center of the $y_i^{th}$ class, $x_i \in R^d$ is the feature vector of the $i^{th}$ image, m is the number of the images in each batch introduced into the trained network, a finally synthesized loss function is $$L = L_s + \lambda L_c = -\sum_{i=1}^{m} \log \frac{e^{W_{y_i}^T x_i + b_{y_j}}}{\sum_{j=1}^{n} e^{W_j^T x_i + b_j}} + \frac{\lambda}{2}\sum_{i=1}^{m} \|x_i - c_{y_i}\|_2^2,$$

wherein $\lambda$ is an influence factor of center loss, which is recommended to be set as 0.01.

As a preferred technical solution, the step (d) comprises the following steps:

(d-1) using Inception-Resnet V1 as a topmost basic network structure, setting a number of nodes of a last fully connected layer of the Inception-Resnet V1 as 128, and adding an L2 norm normalization layer under the basic network structure as an output of the prediction network; and (d-2) making the prediction network load the network parametric model file.

As a preferred technical solution, the step (d) comprises the following steps:

calculating the L2 norm normalization in the step (d-1) by a method that $x \in R^d$ is a one-dimensional feature vector, $x_i$ is an $i^{th}$ component, and then a normalized $i^{th}$ component is $$x_i' = \frac{x_i}{\|x\|_2}.$$

As a preferred technical solution, the step (f) comprises the following steps:

(f-1) inputting the training set in the step (b) into the prediction network, calculating the feature vector of the image, randomly selecting 5000 pairs of positive examples and 5000 pairs of negative examples from the training set, and calculating a distance between feature vectors corresponding to each pair; and (f-2) selecting a threshold with a highest accuracy in dividing the positive examples and the negative examples from an interval of [0,4] as the standard to judge whether the two face images are from the same person.

As a preferred technical solution, in the step (f-1) and the step (g), a method for calculating the Euclidean distance between the feature vectors is that: if two feature vectors are x, y∈Rd, then the Euclidean distance between the two feature vectors is dist=$\|x-y\|_2$.

As a preferred technical solution, in the step (g), if the Euclidean distance between the feature vectors of the two face images obtained through the prediction network is less than the final threshold calculated in the step (f-2), the two face images are judged to be from the same person; if the Euclidean distance is greater than or equal to the final threshold, the two face images are judged to be from different persons.

Compared with the prior art, the present invention has the following advantages and beneficial effects.

1. Different from the traditional face recognition method, the present invention uses pure data driving, and uses the pixel of the face image as the input instead of an artificially constructed feature. Compared with other deep learning methods, the method uses Inception-Resnet V1, which further improves a classification level by a residual network. The combination of a softmax loss and a center loss is used as the loss function for training, which makes the face features obtained after training have a cohesive characteristic, thus having a good performance even in the absence of massive high-quality training sets, and avoiding phenomena of a slow convergence rate and over-fitting during training.

2. The present invention has no specific requirements on angles of the face images, and has an obvious comparison effect on the images of faces with glasses. Therefore, a problem of side face angles and glasses occlusion influencing the face comparison does not need to be worried about.

3. The comparison method of the present invention is simple, and a GPU is used to accelerate and improve a calculating performance, which may be applied to a real-time environment.

BRIEF DESCRIPTION OF THE DRAWINGS

FIG. 3 is a structure diagram of a prediction network of the angle interference resistant and occlusion interference resistant fast face recognition method in the embodiment.

DETAILED DESCRIPTION

The present invention is further described in detail hereinafter with reference to the embodiments and the accompanying drawings, but the embodiments of the present invention are not limited to this.

Embodiment

Figure 1:
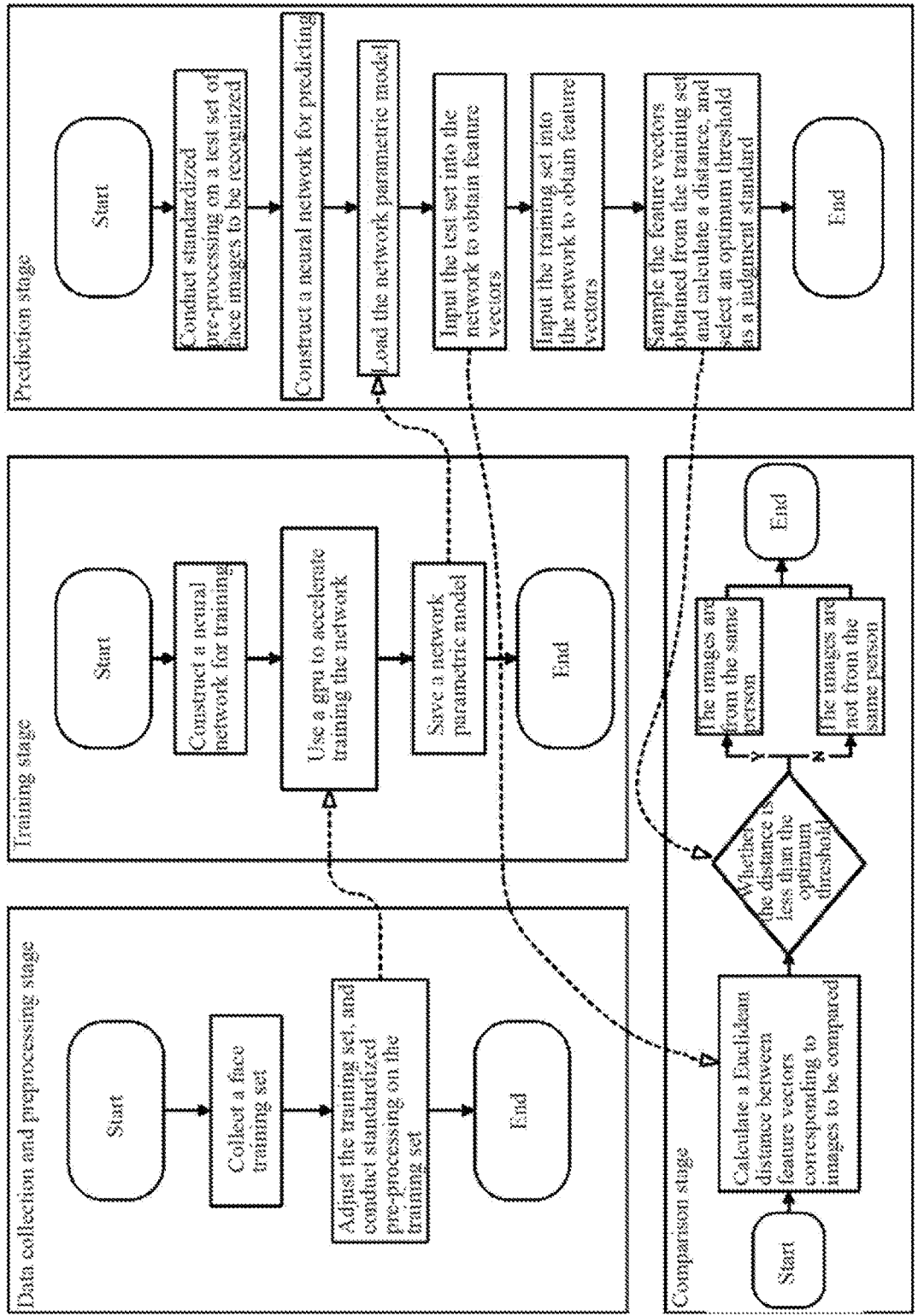
FIG. 1 is a flow chart of an angle interference resistant and occlusion interference resistant fast face recognition method in an embodiment.

As shown in FIG. 1, a main flow of an angle interference resistant and occlusion interference resistant fast face recognition method in the embodiment comprises the following steps.

In a first step, a training set is obtained, and the training set is expanded, adjusted and pre-processed.

A face training set is adjusted to ensure that images of side faces and faces with glasses occupy 10% to 20% of the training set. A dataset is expanded by randomly cropping and randomly flipping, a single-channel image in the dataset is expanded into a three-channel image, and the expanded training set is adjusted to a size of 160×160. A method for expanding the single-channel image into the three-channel image is that a RGB three-channel value of each pixel in the image is assigned as a value of the pixel of the single-channel image. Standardized processing is conducted on the image by a method of $$\text{image\_x}_{std} = \frac{(x - \text{mean})}{\text{adjusted\_stddev}},$$

$$\text{adjusted\_stddev} = \max\left(stddev, \frac{1.0}{\sqrt{numpixels}}\right),$$

wherein x is a pixel value of the image, image_$x_{std}$ is a standardized pixel value, mean is an average value of all the three-channel pixel values in the image, stddev is a standard deviation of the image, and numpixels is a number of image pixels.

In a second step, a trained network is constructed, and a GPU is used to accelerate training.

Figure 2:
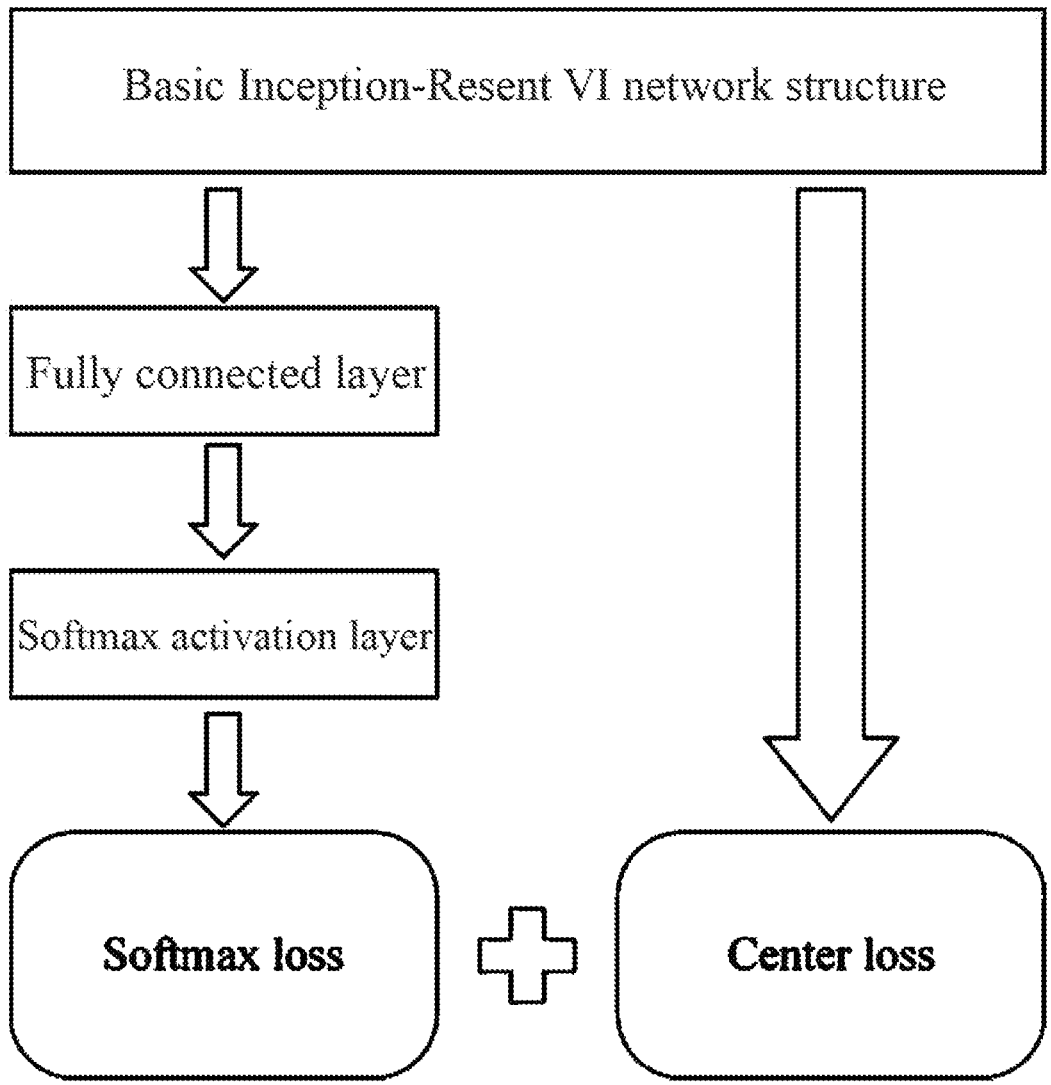
FIG. 2 is a structure diagram of a trained network of the angle interference resistant and occlusion interference resistant fast face recognition method in the embodiment.

A method for constructing a neural network for training the face dataset is that Inception-Resnet V1 is used as a topmost basic network structure first, and a number of nodes of a last fully connected layer thereof is set as 128. The input of the network is a tensor with shape of m*160*160*3, and n is a size of batchsize, i.e., a number of images in each batch during training. A fully connected layer is added under the basic network structure, and the number of the nodes is a number of persons constituting the training set of the face images, for example, if the training set is from faces of 5000 persons, the number of the nodes is set as 5000. A loss function is constructed, and a softmax loss function and a center loss function are used as a final loss function used for training the network. The network structure is shown in FIG. 2. A framework based on a cuda library is used to write a program, and a nvidia GPU is used to accelerate a training speed. A weight of the basic network structure when the training is ended is saved as a network parametric model file.

In a third step, a prediction network is constructed.

A method for constructing a neutral network for predicting the face features is that Inception-Resnet V1 is used as a topmost basic network structure, and a number of nodes of a last fully connected layer thereof is set as 128. Network parameters are initialized by using the network parametric model file saved in the step (c). An L2 norm normalization layer is added under the basic network structure as an output of the prediction network, wherein a method for calculating the L2 norm normalization is that x∈ Rd is a one-dimensional feature vector, xi is an ith component, and then a normalized ith component is $$x'_i = \frac{x_i}{\|x\|_2}.$$

In a fourth step, a test set is adjusted and pre-processed.

A single-channel image in a face test set is expanded into a three-channel image, and all images are adjusted to a size of 160×160. Standardized processing is conducted on the image.

In a fifth step, an optimum threshold is calculated as a judgment standard.

The training set is inputted into the prediction network, the feature vector of the image is calculated, 5000 pairs of positive examples and 5000 pairs of negative examples are randomly selected from the training set, and a Euclidean distance between feature vectors corresponding to each pair of images is calculated. A method for calculating the Euclidean distance between the feature vectors is that: if two feature vectors are x, y∈ $R^d$, then the Euclidean distance between the two feature vectors is dist=$\|x-y\|_2$. A threshold with a highest accuracy in dividing the positive examples and the negative examples is selected from an interval of [0,4] as the standard to judge whether the two face images are from the same person.

In a sixth step, test images are inputted into the prediction network and face comparison is conducted.

The face test images are inputted into the prediction network, the feature vectors of the test images are calculated, a Euclidean distance between feature vectors corresponding to two face images to be compared is calculated according to a Euclidean distance formula dist=$\|x-y\|_2$, and whether the two faces are from the same person is judged according to the optimum threshold. If the distance is less than the optimum threshold, the two face images are from the same person, and if the distance is greater than the optimum threshold, the two face images are not from the same person.

The above embodiments are the preferred embodiments of the present invention, but the embodiments of the present invention are not limited by the above embodiments. Any other changes, modifications, substitutions, combinations, and simplifications made without departing from the spirit and principle of the present invention should be equivalent substitute modes, and should be included in the scope of protection of the present invention.

What is claimed is:

1. An angle interference resistant and occlusion interference resistant fast face recognition method, wherein the method comprises the following steps:
    (a) taking a training set of a large number of face images which have been detected and cropped, and adjusting the training set to make images of side faces and faces with glasses occupy 10% to 20% of a dataset;
    (b) reading in the training set of face images in the step (a), expanding the training set by randomly cropping and randomly flipping, expanding a single-channel image into a three-channel RGB image, scaling the image to a set size, and standardizing the image;
(c) constructing a neural network for training a face dataset by combining and adjusting various effective structures, and inputting dataset in the step (b) into the neural network and using a GPU to accelerate training the neural network, so as to obtain a trained network parametric model file;
(d) extracting a partial structure from the trained neural network constructed in the step (c) to form a neural network for extracting face features for prediction, and using the prediction network to load the network parametric model file obtained in the step (c);
(e) scaling the detected and cropped face images to be compared to the set size in the step (b), and converting a single-channel image therein into a three-channel RGB image;
(f) inputting the training set in the step (b) into the prediction network, calculating feature vectors of the images, sampling the training set and calculating a distance, testing different thresholds as a standard to judge whether two images are from same person, and selecting a threshold with a highest accuracy as a final threshold; and
(g) inputting test images of face in the step (e) into the prediction network in the step (d), calculating the feature vectors of the test images, calculating a Euclidean distance between the feature vectors corresponding to two face images to be compared, and judging whether the two faces are from the same person according to the final threshold calculated in the step (f), and using the final threshold as a judgment standard for face comparison.

2. The angle interference resistant and occlusion interference resistant fast face recognition method according to claim 1, wherein in the step (b), a method for expanding the single-channel image into the three-channel RGB image comprises:
assigning a RGB three-channel value of each pixel in the image as a value of the pixel of the single-channel image, wherein a standardized processing method is:

$$\text{image\_x}_{std} = \frac{(x - \text{mean})}{\text{adjusted\_stddev}},$$

$$\text{adjusted\_stddev} = \max\left(stddev, \frac{1.0}{\sqrt{numpixels}}\right),$$

wherein x is a pixel value of the image, image\_$xs_{td}$ is a standardized pixel value, mean is an average value of all the RGB three-channel pixel values in the image, stddev is a standard deviation of the image, and numpixels is a number of image pixels.

3. The angle interference resistant and occlusion interference resistant fast face recognition method according to claim 1, wherein the step (c) comprises the following steps:
(c-1) using Inception-Resnet V1 as a topmost basic network structure, and setting a number of nodes of a last fully connected layer of the Inception-Resnet V1 as 128;
(c-2) adding a fully connected layer under the basic network structure, the number of the nodes being a number of persons constituting the training set of the face images;
(c-3) constructing a loss function, and using a softmax loss function and a center loss function as a final loss function used for training the network; and
(c-4) using an Adagrad method as an optimizer to train the neural network and starting to use the GPU to accelerate training the neural network, and saving the network parametric model file after network convergence.

4. The angle interference resistant and occlusion interference resistant fast face recognition method according to claim 3, wherein in the step (c-1) and the step (c-2), network model parameters are initialized by truncated normal distribution with a standard deviation of 0.1, wherein weight decay is set as 0.00005, and a retention rate of a dropout layer in the network is set as 0.8.

5. The angle interference resistant and occlusion interference resistant fast face recognition method according to claim 3, wherein the softmax loss function in the step (c-3) is $$L_s = -\sum_{i=1}^{m} \log \frac{e^{W_{y_i}^T x_i + b_{y_j}}}{\sum_{j=1}^{n} e^{W_j^T x_i + b_j}},$$

wherein $x_i \in R^d$ is a feature vector of an $i^{th}$ image, which belongs to a $y_i^{th}$ class, d is a feature dimension of the feature vector, $W \in R^{d \times n}$ is a weight matrix of the fully connected layer in the step (c-2), $W_j \in R^D$ is a $j^{th}$ column of W, $b \in R^n$ is an offset value, m is a number of images in each batch introduced into the trained neural network, and n is a number of classes; and
the center loss function in the step (c-3) is $L_c = \frac{1}{2} \Sigma_{i=1}^{m} \|x_i - c_{y_i}\|_2^2$, wherein $Cy_i \in R^d$ is a center of the $y_i^{th}$ class, $x_i \in R^d$ is the feature vector of the $i^{th}$ image, m is the number of the images in each batch introduced into the trained network, a finally synthesized loss function is $$L = L_s + \lambda L_c = -\sum_{i=1}^{m} \log \frac{e^{W_{y_i}^T x_i + b_{y_j}}}{\sum_{j=1}^{n} e^{W_j^T x_i + b_j}} + \frac{\lambda}{2} \sum_{i=1}^{m} \|x_i - c_{y_i}\|_2^2,$$

wherein $\lambda$ is an influence factor of center loss, which is recommended to be set as 0.01.

6. The angle interference resistant and occlusion interference resistant fast face recognition method according to claim 1, wherein the step (d) comprises the following steps:
(d-1) using Inception-Resnet V1 as a topmost basic network structure, setting a number of nodes of a last fully connected layer of the Inception-Resnet V1 as 128, and adding an L2 norm normalization layer under the basic network structure as an output of the prediction network; and
(d-2) making the prediction network load the network parametric model file.

7. The angle interference resistant and occlusion interference resistant fast face recognition method according to claim 6, wherein the step (d) comprises the following steps:
calculating the L2 norm normalization in the step (d-1) by a method that $x \in R^d$ is a one-dimensional feature vector, $x_i$ is an $i^{th}$ component, and then a normalized $i^{th}$ component is $$x'_i = \frac{x_i}{\|x\|_2}.$$

8. The angle interference resistant and occlusion interference resistant fast face recognition method according to claim 1, wherein the step (f) comprises the following steps:
(f-1) inputting the training set in the step (b) into the prediction network, calculating the feature vector of the image, randomly selecting 5000 pairs of positive examples and 5000 pairs of negative examples from the training set, and calculating a distance between feature vectors corresponding to each pair; and
(f-2) selecting a threshold with a highest accuracy in dividing the positive examples and the negative examples from an interval of [0,4] as the standard to judge whether the two face images are from the same person.

9. The angle interference resistant and occlusion interference resistant fast face recognition method according to claim 8, wherein in the step (f-1) and the step (g), a method for calculating the Euclidean distance between the feature vectors is that: if two feature vectors are x, y∈ $R^d$, then the Euclidean distance between the two feature vectors is dist=$\|x-y\|_2$.

10. The angle interference resistant and occlusion interference resistant fast face recognition method according to claim 7, wherein in the step (g), if the Euclidean distance between the feature vectors of the two face images obtained through the prediction network is less than the final threshold calculated in the step (f-2), the two face images are judged to be from the same person; if the Euclidean distance is greater than or equal to the final threshold, the two face images are judged to be from different persons.

* * * * *